Figure 1:
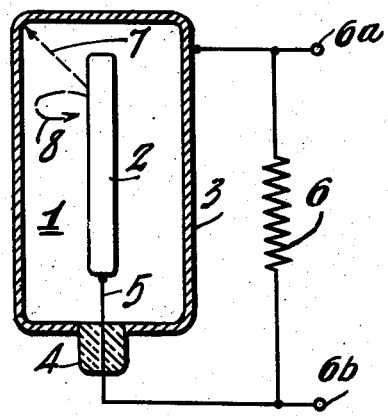

May 29, 1951     E. G. LINDER     2,555,143

NUCLEAR ELECTRICAL GENERATION SYSTEM AND METHOD

Filed June 30, 1948

INVENTOR
*Ernest G. Linder*
BY J. L. Whittaker
ATTORNEY

Patented May 29, 1951

2,555,143

UNITED STATES PATENT OFFICE 2,555,143

NUCLEAR ELECTRICAL GENERATION
SYSTEM AND METHOD

Ernest G. Linder, Princeton, N. J., assignor to
Radio Corporation of America, a corporation
of Delaware Application June 30, 1948, Serial No. 36,241

10 Claims. (Cl. 171—330)

This invention relates generally to nuclear electric generators and more particularly to unique methods of and means for deriving and utilizing the electrical energy of nuclear reactions.

The enormous magnitudes of energy provided by certain nuclear reactions of radioactive substances provide a tremendous field for the development of new sources of electrical energy. Since some radioactive radiations are largely electrical in nature, it is desirable that such electrical energy be converted directly to electrical energy of usable form. The alpha-particle and beta-particle emissions from certain radioactive substances comprise positively or negatively charged particle rays, respectively, having energies which vary from low values to several million electron volts. For example, alpha-ray emission comprises positively charged particles having energies varying from zero to the order of ten million electron volts, while beta-particle emission comprises negatively charged particles having energies varying from low values to the order of three million electron volts. Nuclear reactions are known to provide either alpha-particle emission, beta-particle emission, or a combination of alpha-particle and beta-particle emission as well as other types of charged particles not generally so well known. The direct utilization of the high electrical potentials which may be derived from such charged particles provides much more convenient and efficient utilization of nuclear energy than previously proposed systems wherein the nuclear energy is converted to thermal energy, the thermal energy converted to mechanical energy, and the mechanical energy then converted to electrical energy in a usable form. Also, the direct utilization of the electrical energy of nuclear reactions may be much more readily controlled by electrical methods than may the conversion of nuclear energy to thermal energy.

The instant invention comprises improvements on the methods and systems disclosed and claimed in copending U. S. application Serial No. 679,081, filed June 25, 1946, now Patent 2,517,120, granted August 1, 1950, which contemplates the use of collector electrodes for collecting the charged particle rays from a radioactive source, and means for applying the resultant unidirectional potential between the source and collector electrodes to a load.

One of the improvements comprising the instant invention includes providing a time control for the building up of the potentials in a nuclear electric generator. Another improvement comprises the providing of a simple nuclear electric generator of pulsating or saw-tooth currents.

Among the objects of the invention are to provide improved methods of and means for generating electrical energy in response to nuclear reactions. Another object is to provide improved methods of and means for utilizing the electrical energy in nuclear reactions for generating high unidirectional potentials. An additional object is to provide improved methods of and means for utilizing atomic energy for generating electrical energy. A still further object of the invention is to provide improved methods of and means for utilizing radioactive materials as sources of electrical energy.

Another object of the invention is to provide improved methods of and means for converting atomic energy directly to electrical energy in commercially usable forms. An additional object is to provide improved methods of and means for employing nuclear reactions to generate electrical currents.

A further object is to provide improved methods of and means for utilizing charged particle emission of nuclear reactions of radioactive materials to generate time controlled varying electric potentials. A still further object is to provide improved methods of and means for generating pulsating currents. A further object is to provide improved methods of and means for generating saw-tooth potentials. A further object is to apply saw-tooth and unidirectional potentials produced in a nuclear electric generator to practical electronic and electric circuits.

Figure 2:
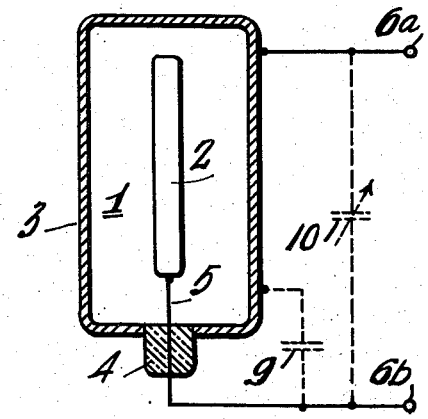
Figure 3:
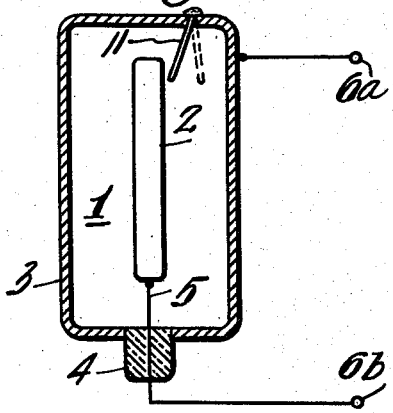
Figure 4:
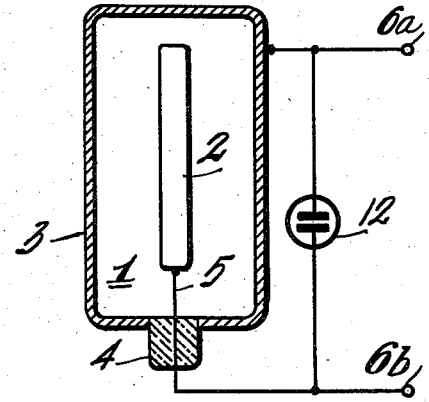
Figure 5:
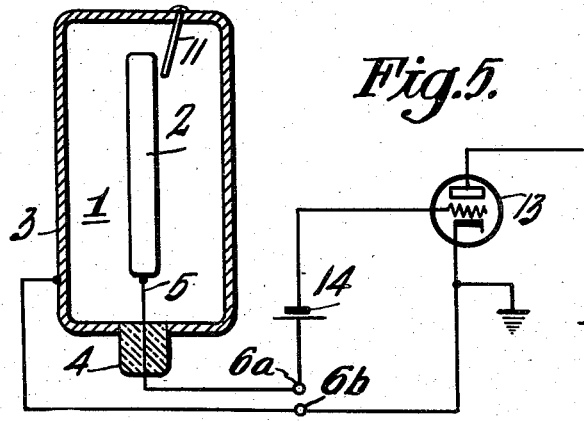

The various embodiments and feature of the invention will be described in detail hereinafter by reference to the accompanying drawing of which Figure 1 is a schematic diagram of the basic embodiment of the invention disclosed in said copending application and including a simple unidirectional voltage generator; Figure 2 is a schematic diagram of a first embodiment of the instant invention; Figure 3 is a schematic diagram of a second embodiment of the instant invention, applied as a saw-tooth generator; Figure 4 is a schematic diagram of a third embodiment of the instant invention; and Figure 5 is a schematic diagram of a modification of the second embodiment of the instant invention as applied to an electronic amplifier. Similar reference characters are applied to similar elements throughout the drawing.

Referring to the drawing, Figure 1 illustrates the simplest form of the invention disclosed in said copending application and included herein for the purpose of describing the principles and operation of the system comprising a unidirectional high voltage generator 1. The generator 1 includes a source 2 to provide alpha-rays or beta-rays or other charged radiation derived from a quantity of radioactive material. A suitable alpha-ray radioactive source may comprise, for example, a quantity of polonium ($84Po^{210}$). Likewise, a suitable beta-ray source may comprise a suitable quantity of radioactive phosphorus ($15P^{32}$). Radioactive phosphorus is a pure beta-ray emitter which becomes stable after emission. It is thus suitable for use as an electronic power source since it emits no gaseous reaction products and, therefore, it is particularly suitable for vacuum applications.

The radioactive source 2 is surrounded, for example, by a highly evacuated conductive collector electrode 3 having an aperture insulator 4 therein. A suitable terminal lead 5 for the radioactive source 2 passes through insulator 4. A load 6 is connected to the collector electrode 3 and the source terminal 5 at load terminals 6a and 6b. If desired, the collector electrode 3 may be grounded.

Known beta-ray emitters provide electrons having energies from almost zero to 3 million electron volts. Known alpha-ray emitters provide positively charged alpha particles having energies from about zero to the order of 10 million electron volts. If desired, an alpha-particle source may be employed instead of a beta-particle source, in which case the collector electrode 3 will be charged positively until it reaches a potential sufficiently high to repel additional alpha particles. In such a modification of the invention, the collector electrode 3 becomes the positive terminal and the radioactive source 2 the negative terminal of the generator.

The operation of the device will be described as a beta-ray emitter comprising the radioactive source. In the absence of a load being connected to the device, beta particles (electrons) emitted by the radioactive source 2 travel to the collector electrode 3, as indicated by the dash line arrow 7, and charge it negatively. The charge upon the collector electrode is negative with respect to the source 2 and increases until the potential of the collector electrode is sufficiently high to repel additional electrons arriving from the source 2, as indicated by the dash line arrow 8. If a load 6 is connected between the collector electrode and the source terminal, a current will flow through the load, power will be dissipated therein, and the output voltage will vary as an inverse function of the total load and leakage power.

It is known that the number of particles emitted from a finite amount source 2 material is constant throughout a unit of time, if emission decay is ignored, but as the particles are emitted and charge the electrode 3, a condition of equilibrium of the potential of electrode 3 is reached beyond which the potential will not increase due to the electrostatic field of the electrode effectively preventing any further particles reaching the electrode.

During the first part of the charging of the collecting electrode the ratio of the force of its electrostatic field to the energy of emitted particle is small and as the number of emitted particles is constant as to time, the charging rate of the electrode will be substantially linear.

During the period of linear charging of the electrode, its potential in volts (V) is determined by the equation $$V = \frac{i}{C} t \tag{1}$$

where $i$ is the emission current of source in amperes 2, C is the capacity in farads between the source 2 with its terminal lead 5 and electrode 3, combined with the capacity of the load, if any, to which the device is connected. In Figure 2, dotted lines 9 represent the internal capacity of the generator and dotted lines 10 represent the capacity of the load 6 (not shown). The rate of rise of the potential across the device may, therefore, be controlled by varying the value of C, either by changing the capacity value of the load circuit or by the use of a condenser between electrode 3 and source 2, as indicated at 9, Figure 2.

As an example of the embodiment of my invention in a device, a cathode 2.5 cms. in length and 0.8 cm. in diameter is plated with 100 millicuries of polonium. The emission current from this source is approximately $0.6 \times 10^{-9}$ amperes. With a cylindrical electrode 1.6 cms. in diameter and 2.5 cms. long, the capacity of the generator is approximately 2 $\mu\mu f$. Substituting these values in Equation 1, $$V = \frac{0.6 \times 10^{-9}}{2 \times 10^{-12}} t \tag{2}$$

$$= 300t \tag{3}$$

Thus a voltage increase of 300 volts per second is available. As stated hereinbefore the rate of increase of the voltage V may be controlled by varying the value of C.

A practical application of my invention is disclosed in Figure 3 which illustrates the use of the device as a saw-tooth generator. The device is basically the same as is shown in Figure 2, except that a flexible vane or conducting fiber 11 is mounted on electrode 3, the unmounted end of vane 11 being free to move toward or away from source 2 under restraint of or due to its stiffness and the rigidity of its mounting on electrode 3. As electrode 3 is charged, vane 11 is attracted to source 2 it being of the opposite potential to that of source 2. At a certain potential, vane 11 will contact source 2, thus short-circuiting the electrode 3 and the source 2 and discharging the generator. Upon the discharging of the device, vane 11 returns to its equilibrium position as determined by its position of mounting and another cycle of the charging of electrode 3 and its later discharging recommences.

It is pointed out that the frequency of this cycle may be controlled by the geometry and elastic constants of vane 11. It is obvious that an independently actuated vibrating vane may be used, whereby the frequency of the cycles is independently controlled.

A modification of the arrangement disclosed in Figure 3 is shown in Figure 4, in which the function of vane 11 is substituted by a gas discharge tube 12. This tube is connected across the load terminals of the device so that when the potential between the electrode 3 and the source 2 reaches a predetermined value, the gas tube becomes conductive and the device discharges and another cycle recommences. Thus in both of the devices illustrated in Figures 3 and 4, the gradually rising potential, generated as described heretofore, is suddenly interrupted, as by the operation of the elements 11 or 12 respectively, with a resultant output voltage of saw-tooth wave-form.

Figure 5 illustrates one application of devices shown in Figures 3 and 4 to electrical equipment, shown as an amplifier. The load terminal 6a is connected to the grid of the amplifier tube 13 and the load terminal 6b is connected to the filament of the tube 13. A battery 14 may be inserted in the grid circuit of tube 13 to provide a bias for the grid of tube 13.

Thus the invention described and claimed herein comprises unique methods of and means for generating time-controlled varying rising potentials by using directly the electrical properties of radioactive emission and applying those potentials to practical electrical circuits.

I claim as my invention:

1. Apparatus for primarily generating electrical energy including a source of radioactive material providing charged particle emission, means disposed in a region adjacent to said source responsive to said charged particle emission for establishing a rising potential with respect to said source, means for controlling the rate of rising of said potential, and means for utilizing said potential.

2. Apparatus for primarily generating cyclic electrical energy including a source of radioactive material providing charged particle emission, means disposed in a region adjacent to said source responsive to said charged particle emission for establishing a rising potential with respect to sad source, and means for cyclically controlling the magnitude of said potential comprising means responsive to a first predetermined magnitude of said potential for neutralizing said potential and responsive to a second predetermined value of said potential for reestablishing said rising potential, and means for utilizing said potential.

3. Apparatus for primarly generating cyclic pulsating electrical energy including a source of radioactive material providing charged particle emission, means disposed in a region adjacent to said source responsive to said charged particle emission for establishing a rising potential with respect to said source, means for cyclically short-circuiting said potential means and said source in response to a first predetermined value of said potential and for cyclically open-circuiting said potential means and said source in response to a second predetermined value of said potential, and means for utilizing said potential.

4. Apparatus for primarily generating cyclic electrical energy including a source of radioactive material providing charged particle emission, means disposed in a region adjacent to said source responsive to said charged particle emission for establishing a rising potential with respect to said source, means responsive to a first predetermined value of said rising potential for short-circuiting said potential means and said source and for open-circuiting said potential means and said source in response to a second predetermined value of said potential, and means for utilizing said potential.

5. Apparatus for primarily generating cyclic electrical energy including a source of radioactive material providing charged particle emission, means disposed in a region adjacent to said source responsive to said charged particle emission for establishing a rising potential with respect to said source, means for controlling the rate of rise of said potential, means for short-circuiting said potential means and said source when said potential has risen to a predetermined value and open-circuiting said potential means and said source when said short-circuiting has been accomplished, and means for utilizing said potential.

6. Apparatus for primarily generating cyclic electrical energy including a source of radioactive material providing charged particle emission, means disposed in a region adjacent to said source responsive to said charged particle emission for establishing a rising potential with respect to said source, vibrating means responsive to said potential for short-circuiting said potential means and said source when said potential has risen to a predetermined value and open-circuiting said potential means and said source when said short-circuiting has been accomplished, and means for utilizing said potential.

7. Apparatus for primarily generating cyclic electrical energy including a source of radioactive material providing charged particle emission, means disposed in a region adjacent to said source responsive to said charged particle emission for establishing a rising potential with respect to said source during a predetermined interval of time, ionizable means for neutralizing said potential when said potential has risen to a predetermined value and for reestablishing said rising potential, and means for utilizing said potential.

8. Apparatus for primarily generating cyclic electrical energy including a source of radioactive material providing charged particle emission, means disposed in a region adjacent to said source responsive to said charged particle emission for establishing a rising potential with respect to said source during a predetermined interval of time, means for controlling the rate of rising of said potential, means for neutralizing said potential when said potential has risen to a predetermined value and for reestablishing said rising potential, and means for utilizing said potential.

9. Apparatus for primarily generating electrical energy including a source of radioactive material providing charged particle emission, means disposed in a region adjacent to said source responsive to said charged particle emission for establishing potential with respect to said source, means for recurrently varying the magnitude of said potential, and means for utilizing said potential.

10. Apparatus for primarily generating electrical energy including a source of radioactive material providing charged particle emission, means disposed in a region adjacent to said source responsive to said charged particle emission for establishing a varying potential with respect to said source, means for controlling the rate of variation of said potential, and means for utilizing said potential.

ERNEST G. LINDER.

REFERENCES CITED

The following references are of record in the file of this patent:

"The Electrician," October 31, 1924, page 497.